United States Patent [19]

Brander et al.

[11] Patent Number: 4,495,205

[45] Date of Patent: Jan. 22, 1985

[54] MEAT ANALOG PRODUCT

[75] Inventors: Rita W. Brander, New Rochelle, N.Y.; Teresa A. Raap, Ridgefield, Conn.

[73] Assignee: General Foods Corporation, White Plains, N.Y.

[21] Appl. No.: 538,591

[22] Filed: Oct. 3, 1983

[51] Int. Cl.$^3$ ............................................... A23J 3/00
[52] U.S. Cl. .................................... 426/104; 426/274; 426/656; 426/646; 426/486; 426/802; 426/524; 426/574
[58] Field of Search ............... 426/104, 272, 274, 574, 426/656, 657, 486, 802, 646, 524

[56] References Cited

U.S. PATENT DOCUMENTS

| | | | |
|---|---|---|---|
| 3,713,837 | 1/1973 | Leidy et al. | 426/802 X |
| 3,920,853 | 11/1975 | Middendorf et al. | 426/104 |
| 4,001,459 | 1/1977 | Kim et al. | 426/802 X |
| 4,265,917 | 5/1981 | Fabre | 426/104 |
| 4,341,806 | 7/1982 | Gadsby et al. | 426/802 X |

Primary Examiner—Robert Yoncoskie
Attorney, Agent, or Firm—Sam D. Walker; Thomas R. Savoie; Daniel J. Donovan

[57] ABSTRACT

The present invention teaches a novel process for preparing a meat analog product, having a texture more closely resembling that of meat, wherein a TVP is heated followed by freezing and thawing. The thawed TVP is combined with a binder composition, formed into a loaf and frozen once again. The frozen product is thawed and cooked.

27 Claims, No Drawings

MEAT ANALOG PRODUCT

TECHNICAL FIELD

The present invention relates to a process for preparing proteinaceous food products in the form of chunks or loaves, having a texture similar to meat.

BACKGROUND ART

The food industry has, for many years, attempted to provide high protein, low cost fibrous proteinaceous material as a substitute for meat. This effort has been amplified recently due to the relative shortages and high price for natural meat products. Early efforts to provide meat analog products were developed around a simplified model of natural meat which comprised a system of fiber held together by a suitable binder. To simulate the fibrous texture of natural meat, synthetic textile fiber technology was applied to the preparation of protein fiber which could be bound together to form a meat-like mass.

Conventionally texturized vegetable protein has been produced by utilizing thermal plastic extrusion process, in which a mixture of a protein material, water, flavorings and other ingredients are extruded at very high temperatures and pressures. As the extrudate passes out of the extruder it expands to form a fibrous cellular structure. Upon rehydration the fibrous texturized protein product possesses an appearance and mouthful similar to cooked meat pieces. Patents disclosing thermal plastic extrusion techniques for the forming of texturized protein meat analog are disclosed in U.S. Pat. No. 3,488,770, granted Jan. 6, 1970, to Atkinson; and U.S. Pat. No. 3,496,858, granted Feb. 24, 1970, to Jenkins.

Textured proteins are generally obtained in the form of particles, for example, fiber pieces, fiber extrudate filament, or granules. These particles must be bound together to form shaped meat analog product, for example, beef chunk analogs and chicken analog, among others. To hold these particles together, a suitable binder is required.

Traditionally egg albumin has been used to bind the protein fibers to one another. However, albumin, when used as a sole binder in processes which involve heating and rehydration, has been proven to be somewhat disappointing, in that the product obtained has a floury and looser appearance as compared to natural meat. Additionally, albumin is relatively expensive and quantities needed to effectively function as a binder results in a simulated food product that is relatively expensive.

It has become highly desirable to replace a substantial portion of the albumin with less expensive materials and at the same time produce a meat analog product with meat-like texture and appearance. For example, U.S. Pat. No. 3,343,963 granted Sept. 26, 1967 to K. Jelson discloses a three component binder system comprising albumin, gluten and partially defatted oil seed material; and U.S. Pat. No. 3,594,192 granted July 20, 1971 to Mullen, et al., discloses a binder comprising egg white and modified soy protein; and U.S. Pat. No. 4,265,917 granted to Fabre on May 5, 1981 discloses a binder system comprising water, vital wheat gluten, egg white, dairy seroproteins and soya fibers obtained from spinning. With the use of suitable binders, products similar to meat loaf, meat chunks, hamburger patties and meatballs can be formed.

Other compounds have also been mentioned as possible binders, such as gelatin, casein, wheat flour or soya flour, starches, alginates and pectins.

Despite the efforts in the past, people are continuously trying to make the texture of soy protein more closely resemble that of meat. For instance, different binder systems and processes are being developed in an attempt to establish such end. In most of the patents mentioned above utilizing different binder systems, heat is required to "set up" these binder system, forming a cohesive mass. Heating has been accomplished in a variety of ways. For instance, the above references disclose heating in a conventional oven, microwave oven, pan frying or boiling.

The present invention utilizes a binder system and a novel process which enable the development of a texture even more closely resembling that of meat.

It is therefore the object of the present invention to provide an improved meat analog product with texture similar to that of meat.

Another object of the present invention is to provide a binding system to give good adhesion between the TVP chunks.

A still further object is to provide a 100% extended meat analogs.

Still another object is to provide a meat analog with a protein content similar to that of real meat.

Further objects and advantages will become apparent to one skilled in the art from the following description of my invention.

SUMMARY OF THE INVENTION

It is possible to improve the texture and flavor of texturized vegetable protein, particularly soy base TVP by utilizing the novel process as set forth in the present invention. The present invention discloses a novel process for producing a meat analog product. In this process texturized vegetable protein containing entrapped volatiles is heated in an aqueous medium to remove said volatiles. The heating is followed by a freezing step wherein the fiber structure of the TVP is disrupted and its water binding capacity is decreased. The frozen TVP is thawed and combined with a binder composition. The above combination is mixed until the components are dispersed uniformly. The uniformly mixed ingredients are formed into a loaf, wrapped and frozen. The frozen product is thawed and cooked.

DETAILED DESCRIPTION

By employing the process of the present invention, a texturized vegetable protein product can be prepared, having a texture closely resembling that of hamburger meat.

By the term "texturized vegetable protein" (TVP) is meant that the material has texture imparted by a thermoplastic extrusion process so that disintegration of the physical form will not occur during the water leaching and/or retorting process to which the material is subjected during processing. Generally, this material is prepared by extruding soy flours under conditions of high temperature and pressure generated from the extruder.

The particle size of the TVP needed for carrying out the present invention can be varied. Usually, processing conditions are adjusted to compensate for the varied particle size. For instance, the length of the processing time, will be increased with the particle size. It is preferred, however, that the granulation of the texturized vegetable protein be such that by using a U.S. Standard Sieve, 70% maximum of the TVP will be retained on a #5 screen, 28% minimum of the TVP would be retained on a ⅜ screen and 2% maximum of the TVP would pass through a #6 screen.

In the present invention, TVP containing entrapped volatiles is heated in an aqueous medium to remove said volatiles therefrom. Preferably, the TVP is heated by boiling and is subsequently washed. It is important in the present invention to heat the TVP in an aqueous medium before subjecting it to further processing. Since most TVP's are soya based, boiling becomes an important step in improving the flavor because of the undesirable flavor associated with soy. When soy products are processed for use in foods, they release flavor volatiles which if not removed reincorporates or becomes entrapped into the protein matrix resulting in a product with undesirable flavors. Boiling and washing removes these undesirable flavor volatiles, resulting in a product with a more acceptable flavor.

Heating can also be accomplished by subjecting the TVP to steam. It is preferred however, to heat by boiling. In the present invention the TVP is added to boiling water and the mixture brought to a boil. This takes about 8 to 20 minutes. However, bringing the TVP to a boil within 10 minutes is preferred even though this would depend on the batch size of the TVP being heated. After coming to a boil which occurs at temperatures ranging from 190° F. to 220° F., preferably at 212° F., the water is drained off and the process repeated three times. Once the third boiling is completed the water is drained off and the excess water is removed by pressing.

The boiled washed TVP is then frozen for a time and at a temperature effect to disrupt the fiber structure of the TVP and decrease its water binding capacity. A suitable freezing temperature is from +10° to −10° F. preferably at −5° F., for a period ranging from 5 to 20 hours. Suitable freezing occurs at −5° F. for 7-9 hours. The frozen TVP is then allowed to thaw followed by pressing to remove the unbound water. The moisture level of TVP after pressing should be about 70 to 80% on a weight basis. It is believed that the freeze-thaw pretreatment of the TVP ruptures the structure of the fiber, thereby affecting its ability to hold water. As a result of rupturing the structure of the TVP, the binding between the fibers and binder composition occur without the necessity of added water.

The thawed TVP is then combined with a binder composition, so that the pieces are bonded to one another to form a cohesive mass. A suitable binder composition according to the present invention is a binder comprised of albumin, soy protein isolate, and vital wheat gluten and extruded protein fibers such as spun fibers.

The albumin preferably originates from fresh eggs or dried eggwhite, but it is possible to investigate other sources, such as milk, fish, elastin and keratin. The albumin calculated as a dry material, can be present at a level of from 0 to 23.0% by weight of the binder composition. The amount of albumin in the final product can range from 0 to 7%. However, it is preferred when the level ranges from 2.0 to 3.5%.

The soy protein isolate component of the binder composition, has proven to be an effective binder of particulate texturized soy protein. Soy protein isolate is a name given to protein isolated from soybean under conditions such that the protein resulting is substantially undenatured. The soy protein isolate calculated on a dry basis can be present at levels ranging from 0 to 23.0% by weight of the binder composition. The amount of soy protein isolate in the final product can range from 0 to 7%. However, it is preferred when the level ranges from 2.0 to 3.5%.

Vital wheat gluten is the protein component of wheat flour and is prepared by separating wheat flour into its component, wheat starch, and wheat gluten. Vital wheat gluten sold under the name Pro 80 has proven effective for our process. This product has 80% protein and exhibit amazing cohesive properties in relation to meat pieces. The vital wheat gluten calculated on a dry basis can be present at levels ranging from 0 to 38.0% by weight of the binder composition. The amount of vital wheat gluten in the final product can range from 0 to 11.5%. However, it is preferred when the level ranges from 3.5 to 6%.

The extruded protein fiber can be any protein fiber wherein the diameter of the extrudates ranges from 0.01 mm to 0.001 mm. It is preferred in the present invention to use a spun protein fiber.

The spun protein fiber is prepared in accordance with the conventional process, that is, a spinning rope is formed from alkali stabilized protein and the rope is extruded through a perforated die into an acid precipitating bath. The acid bath sets the filament or fiber as they emerge from the extruder. The spun protein fiber used in accordance with the present invention is present in an amount ranging from 0 to 16% on a dry basis by weight of the binder composition. The amount of extruded protein fiber in the final product can range from 0 to 5%. However, it is preferred when the level ranges from 0.5 to 2%. It is also preferred that the spun protein fiber be pH adjusted to a pH of about 6.4 which affect the texture and binding capacity of the final product.

The amount of binder that is employed will vary with the particular food product desired. The binder composition is in the range of about 8% by weight to 30.5% by weight of the final product. Preferably the binder composition ranges from 8.5 to 15% of the final product.

It is also preferred in the present invention that oil is added to the mixture of TVP and binder composition. The addition of oil affects the binding characteristic of the binder composition, in that, it acts as a medium for intermixing the binder composition since no water is added during this process. The addition of oil also affects the textural quality of the final product, in that it produces a product having a more juicy and firmer texture.

The amount of oil needed for carrying out the present invention should range from 10–25% based on the weight of the final product. It is preferred however, that the level of oil range from 11 to 17%. The oil can be a vegetable oil, suitable for food use. Typically soy oil, olive oil, cotton seed oil, corn oil or any combination thereof are suitable, with soy oil being preferred.

The mixture of TVP and binder is then formed into a mass wherein the ingredients are in intimate admixture. This mass can be in the form of a loaf or the like. It is important at this stage of the process to differentiate between the present invention and the prior art. In the art, the mixture of TVP and binder are heat-set to complete the binding process, that is, the protein molecules in the binder are denatured such that they become insoluble, firmly binding the TVP particles together. Subjecting the TVP and binder composition of the present invention to the processing conditions disclosed in the art, results in a product which lacks textural integrity, that is, the resulting texture is soft and mushy, uncharacteristic of the texture of meat.

In the present invention the mixture of TVP and binder formed into a mass is frozen for a time and at a temperature effective to further disrupt the structure of the TVP and decrease its water binding capacity wherein the water released combines with the binder composition. Temperatures within the range of from −10° F. to +10° F. are suitable. However, −5° F. is preferred. The time required for freezing should be a minimum of 6 hours to preferably about 12 hours. At −5° F. suitable freezing time ranges from 7 to 9 hours.

In the present invention, it is believed that the ice crystal formed as a result of freezing splits the protein fiber, thereby disrupting its structure. When the protein fiber splits, its capacity to hold water decreases and the water trapped therein is released. The water that is released upon freezing acts as a moisture source for the binder composition. These freezing steps are critical in achieving the desired texture, and if bypassed results in a product with unacceptable texture. When the binders and TVP are frozen for a second time as in the present invention, the resulting product has a much firmer and more chewy texture, that is, a texture more closely resembling that of ground meat.

The frozen TVP product can be stored for an extended period. Product stored at 0° F. in excess of 6 months has proven to be acceptable.

The frozen TVP product is thawed before use and then cooked. The thawed product may be used alone or combined with meat and shaped into a meat loaf, hamburger patties, or the like. These products are cooked for a period of time similar to comparable products of which they are replacing. Cooking may be accomplished by frying, baking, microwaving, or any other method used for heating.

The above process enables the mixture of TVP and binder composition to be heat-set at lower temperatures than conventional processes. The temperatures at which the TVP and binder composition is heat-set according to the present invention ranges from 240° to 300° F. For instance, a 100% thawed TVP product is cooked at temperatures ranging from 240° to 280° F. for 5 to 12 minutes, preferably from 250° to 270° F. for 6 to 9 minutes.

The thawed TVP product may be combined with ground meat. The amount of ground meat can range from 20 to 90%, however, it is preferred that the mixture be at a ratio of 1:1. The TVP-ground meat combination is cooked at temperatures ranging from 240° to 300° F. for 5 to 7 minutes, preferably from 250° to 275° F. for 5 to 7 minutes. Also a 100% TVP product may be formed into a patty and fried in oil at temperatures of from 240° to 280° F. for 5 to 7 minutes or the thawed TVP product may be combined with ground meat formed into a patty and fried at temperatures of from 250° to 270° F. for 5 to 7 minutes.

The resulting product of the present invention may also contain additional ingredients to impart desirable taste and appearance. Usually additional ingredients such as flavoring agents, coloring agents, and oils are incorporated into the binder system. Flavors such as chicken, beef, ham and the like are added. Spices and salt are also added as flavor enhancers.

It is preferred in the present invention that the disclosed process steps be followed, that is, the TVP is boiled, washed, frozen, thawed, mixed with binders, frozen, thawed and cooked. This process results in a product with a texture more closely resembling that of ground meat.

It is also an optional step in the present invention that the boiled-washed TVP be treated with lecithin and oil. The lecithin to oil ratio should be 1 to 28 and the amount of lecithin/oil added should range from 3.6 to 7.2. It is important to achieve the best result that the lecithin/oil be added during the first and the last boiling stage of the process. The addition of lecithin and oil affects the texture of the final product in that the final product is more juicy and the texture more closely resemble that of ground meat.

In order to further illustrate and further explain the present invention the following examples are presented, it being understood that the same are not to be taken as limiting in any sense. Unless otherwise indicated all parts or precentages are by weight.

EXAMPLE 1

Three thousand grams of water was brought to a boil, then 120 grams TVP added. The mixture was brought to a boil by heating the mixture to 212° F., stirring occasionally. After the mixture was brought to a boil, the TVP was then rinsed until the water was clear. This process was repeated three times, and after the final rinse the excess water was pressed from the TVP through a cheese-cloth. The pressed TVP was then frozen for 8 hours at a temperature of −5° F. The frozen TVP was then thawed and the excess water present was pressed from the TVP through cheese cloth to a moisture level of 78.5%.

The 78.5% moisture TVP was then placed into a 5 quart Hobart bowl wherein a binder system consisting of 5.75 grams of Pro 80 vital wheat gluten, 3.30 gram of egg white, 3.30 grams of soy isolate and 1.0 gram of spun protein fiber was added together with 18.25 grams of oil and 4.35 grams of other flavoring compositions. The mixture was thoroughly mixed for 2 minutes at Speed No. 2. The thoroughly mixed TVP was formed into a mass by pressing the material together in the form of a loaf. The loaf was then wrapped and placed into a freezer for 15 hours at −5° F.

The frozen loaf was thawed, formed into a hamburger pattie and fried in a skillet at 260° F. in 50 cc oil until brown. The resulting product had a flavor and texture similar to a hamburger patty.

EXAMPLE II

A loaf prepared in accordance with example I wherein the thawed loaf was mixed with ground chuck at a ratio of 1:1. The mixture of ground chuck and TVP was formed into hamburger patties and fried in a skillet at 270° F. in 50 cc of oil for 6 minutes.

EXAMPLE III

Three thousand grams of water was brought to a boil, then 6.9 grams of oil, 0.25 grams lecithin and 120 grams of TVP was added. The mixture was brought back to a boil, stirring occasionally. The TVP was then rinsed until water was clear.

A fresh 3,000 grams water was added to the boiled TVP and brought to a boil. The boiled TVP was rinsed once again until the water was clear. The first step was repeated with oil and lecithin, the mixture brought to a boil and rinsed until the water was clear. The excess water was pressed from the TVP through a cheese cloth. The processed TVP was then frozen for 8 hours at a temperature of −5° F. The frozen TVP was then thawed and the excess water present was pressed from the TVP through cheese cloth to a moisture level of 78.5%.

The 78.5% moisture TVP was placed into a 5 quart Hobart bowl wherein a binder system consisting of 5.75 grams of Pro 80 vital wheat gluten, 3.30 gram of egg white, 3.30 grams of soy isolate and 1.0 gram of spun protein fiber was added together with 18.25 grams of oil and 4.35 grams of other flavoring compositions. The mixture was thoroughly mixed for 2 minutes at Speed No. 2. The thoroughly mixed TVP was formed into a loaf, wrapped and placed into a freezer for 15 hours at −5° F.

The frozen loaf was thawed, formed into a hamburger pattie and fried in a skillet at 260° F. in 50 cc oil until brown.

EXAMPLE IV

A loaf was prepared in accordance with Example I or III wherein the thawed loaf was mixed with ground chuck at a ratio of 1:1. The mixture of ground chuck and TVP was formed into hamburger patties and fried in a skillet at 260° F. in 50 cc of oil for 6 minutes.

EXAMPLE V

A product prepared according to examples I, II, III and IV wherein the TVP and the TVP and beef chuck combination was formed into a meat loaf and baked until done.

What is claimed is:

1. A process for preparing a meat analog product from texturized vegetable protein (TVP), comprising;
    (a) heating a TVP containing entrapped volatiles in an aqueous medium to remove said volatiles therefrom;
    (b) freezing the heated TVP with removed volatiles for a time and at a temperature effective to disrupt the fiber structure of the TVP and decrease its water binding capacity;
    (c) thawing and combining the thawed TVP with a binder composition;
    (d) forming a mass wherein the combined TVP and binder composition are in intimate admixture;
    (e) freezing the formed mass for a time and at a temperature effective to further disrupt the structure of the TVP and decrease its water binding capacity wherein the water released combines with the binder composition; and
    (f) thawing and cooking the mass.

2. A process according to claim 1 wherein the TVP is heated in water at temperatures ranging from 190° to 220° F.

3. A process according to claim 1 wherein the TVP is heated in water at a temperature of about 212° F.

4. A process according to claim 1 comprising additional steps of heating the TVP twice more and washing the heated TVP in water after each heating step until the water is clear.

5. A process according to claim 1 comprising an additional step of pressing the excess water from the heated, washed TVP to a moisture of from 70 to 80% by weight.

6. A process according to claim 1 wherein in step (b) the TVP is frozen for 5 to 20 hours at temperatures ranging from −10° to +10° F.

7. A process according to claim 6 wherein the TVP is frozen for 7–9 hours at about −5° F.

8. A process according to claim 1 wherein the TVP is thawed and is combined with a binder composition comprising albumin, soy isolate, vital wheat gluten, and extruded protein fiber.

9. A process according to claim 1 or 8 wherein the binder composition is comprised of 0 to 23% albumin, 0 to 23% soy protein isolate, 0 to 38% vital wheat gluten, and 0 to 16% extruded protein fiber.

10. A process according to claim 1 or 8 wherein the binder composition comprises 0–7% albumin, 0–7% soy protein isolate, 0–11.5% vital wheat gluten, and 0 to 5% extruded protein fiber based on the weight of the final product.

11. A process according to claim 10 wherein the binder composition comprises of 2.0 to 3.5% albumin, 2.0 to 3.5% soy protein isolate, 3.5 to 6.0% wheat gluten and 0.5 to 2% extruded protein fiber based on the weight of the final product.

12. A process according to claim 1 wherein the binder composition is in the range of about 8% to 30.5% by weight based on the product.

13. A process according to claim 12 wherein the binder composition is in the range of about 8.5% to 15% by weight based on the product.

14. A process according to claim 1 comprising an additional step of adding an oil to the mixture of TVP and binder composition.

15. A process according to claim 14 wherein the amount of oil added ranges from 10–25% based on the weight of the final product.

16. A process according to claim 14 wherein the amount of oil added ranges from 11–17% based on the weight of the final product.

17. A process according to claim 14 wherein the oil can be a vegetable oil selected from a group consisting of soy oil, olive oil, cotton seed oil and corn oil and combinations thereof.

18. A process according to claim 14 wherein the added oil is soy oil.

19. A process according to claim 1 wherein in step (e) the formed mass is subjected to freezing at a temperature of from −10° F. to +10° F. for 6 to 12 hours.

20. A process according to claim 19 wherein the formed mass is subjected to freezing at a temperature of −5° F. for 7 to 9 hours.

21. A process according to claim 1 wherein the frozen loaf is thawed and cooked at temperatures ranging from 240° to 280° F. for 5 to 12 minutes.

22. A process according to claim 21 wherein the thawed loaf is cooked from 250° to 270° F. for from 6 to 9 minutes.

23. A process according to claim 1 comprising an additional step of combining the thawed loaf with from 20 to 90% ground meat and the combination of ground meat and meat analog are cooked for 5 to 7 minutes at from 240° to 300° F.

24. A process according to claim 23 wherein the ground beef and meat analog are cooked for 5 to 7 minutes an at 250° to 275° F.

25. A process according to claim 1 wherein the meat analog is fried in oil at temperatures of from 240° to 280° F. for 5 to 7 minutes.

26. A process according to claim 23 wherein the meat analog combined with ground meat is fried in oil at a temperature of from 250° to 270° F. for 5 to 7 minutes.

27. A texturized vegetable protein product made by the process according to claim 1.

* * * * *